Mar. 27, 1923.

J. HUBER ET AL

GRAIN SAVING DEVICE FOR THRASHING MACHINES

Filed July 28, 1921   2 sheets-sheet 1

1,450,040

Inventor
J. Huber and
S. Huber.

By
Geo. P. Kimmel. Attorney

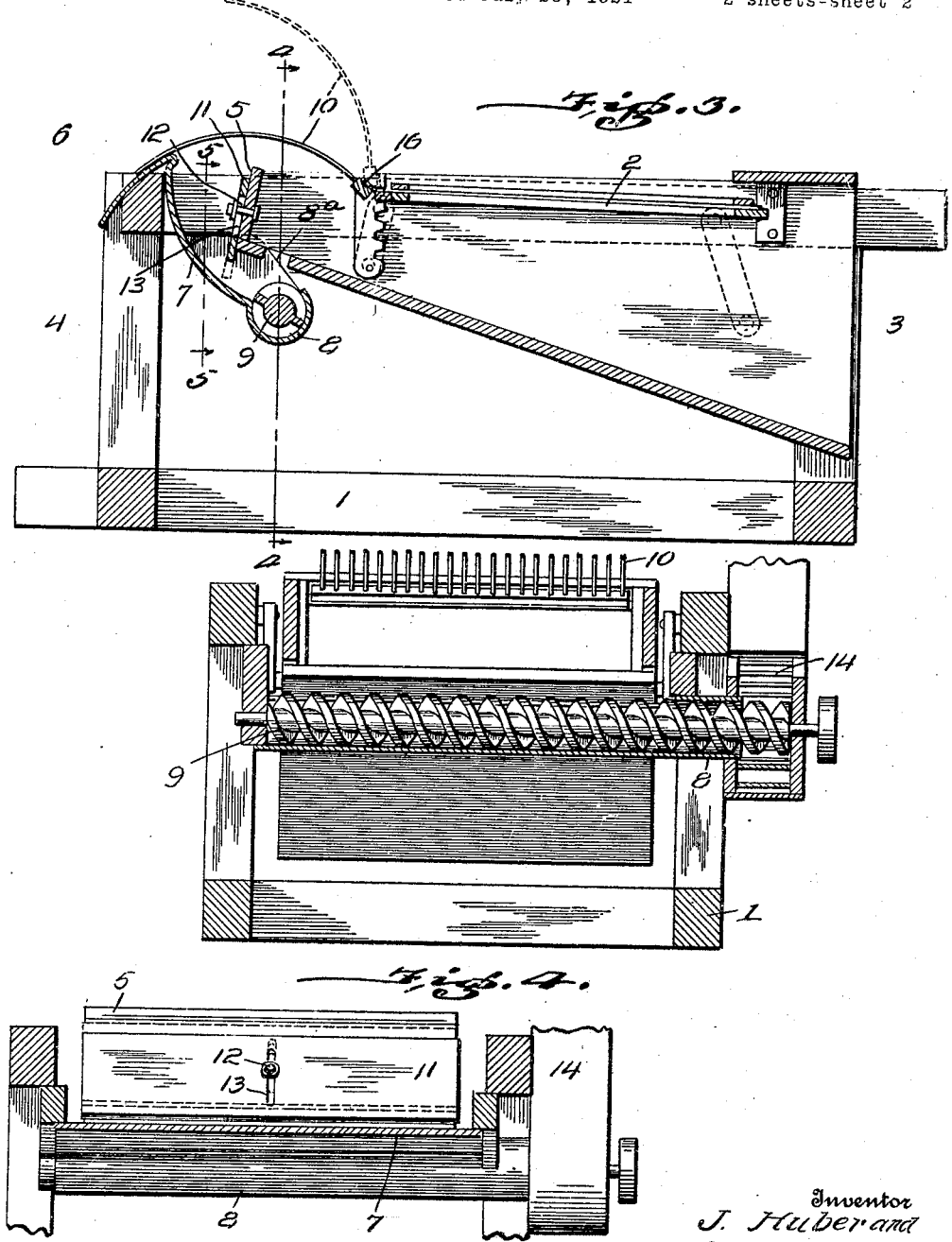

Patented Mar. 27, 1923.

1,450,040

UNITED STATES PATENT OFFICE.

JOE HUBER AND SAMUEL HUBER, OF FORMOSO, KANSAS.

GRAIN-SAVING DEVICE FOR THRASHING MACHINES.

Application filed July 28, 1921. Serial No. 488,122.

*To all whom it may concern:*

Be it known that we, JOE HUBER and SAMUEL HUBER, citizens of the United States, residing at Formoso, in the county of Jewell and State of Kansas, have invented certain new and useful Improvements in a Grain-Saving Device for Thrashing Machines, of which the following is a specification.

This invention relates to thrashing machines, and more particularly to mechanisms applied thereto for trapping and saving grain which has not been separated and collected by the straw separating mechanisms in the machine, such grain being mingled with the straw and chaff and discharged from the straw racks and winnowing devices into the hopper of the stacker from which it is withdrawn by the stacker fan and discharged onto the straw stack to become wasted.

The object of this invention is to provide simple and efficient means for capturing such grain and returning the same to the separator or elsewhere to be reclaimed and saved.

With these and other objects in view, the invention consists in certain novel features of construction as hereinafter shown, described and claimed.

In the accompanying drawings:

Fig. 3 is a longitudinal vertical section taken on the line 3—3 of Fig. 1.

Fig. 4 is a transverse vertical section taken on the line 4—4 of Fig. 3; and

Fig. 5 is a detail transverse section taken on the line 5—5 of Fig. 3.

Figure 1:
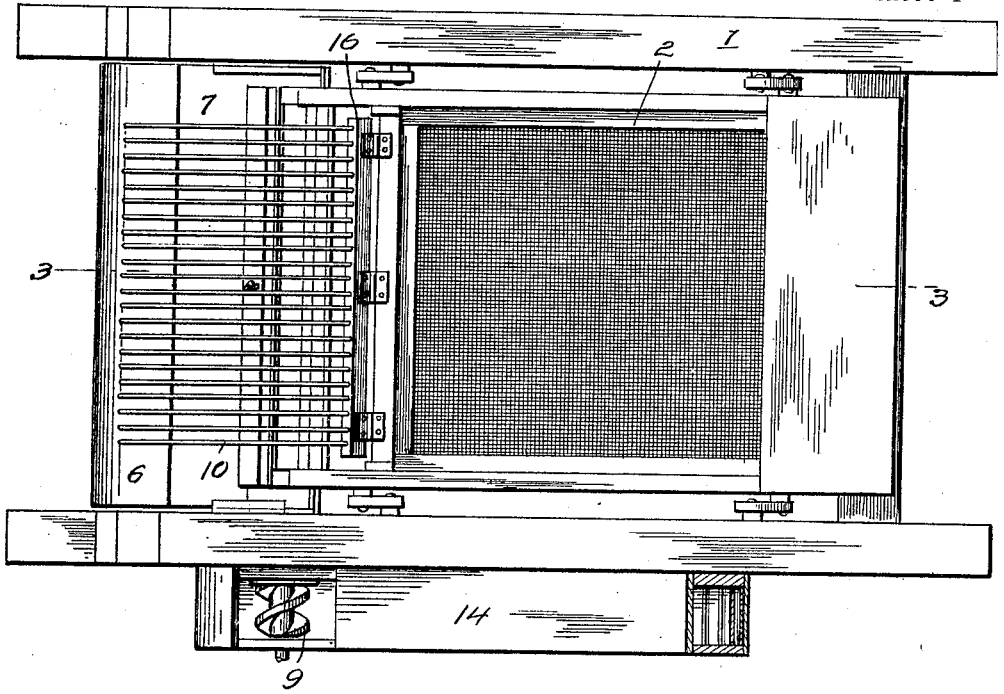
Figure 1 represents a top plan view of a portion of a thrashing machine embodying this invention, parts being in section.
Figure 2:
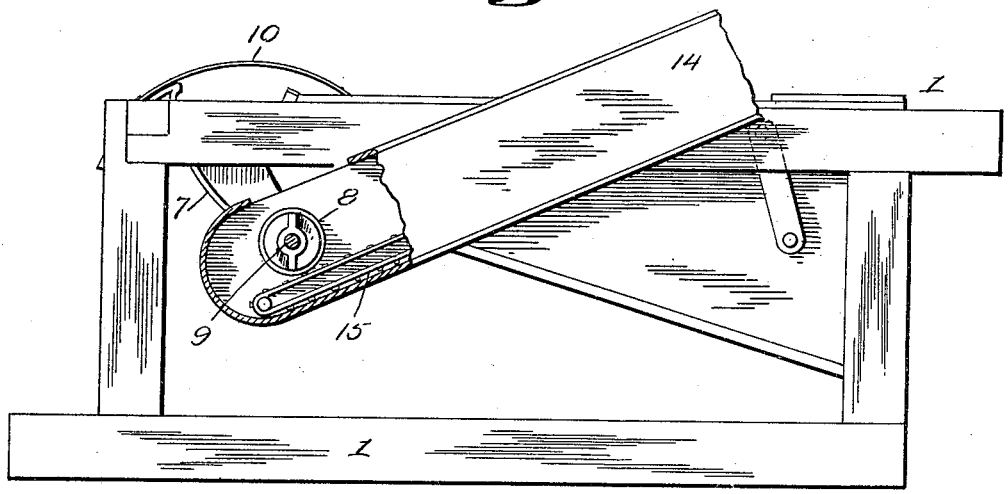
Fig. 2 is a side elevation thereof with parts broken out and in section.

In the embodiment illustrated, a suitable frame 1 is shown having a shaker screen or grain pan 2 mounted for rocking movement therein, the cleaning fan end being shown at 3, and the wind stacker end at 4.

At the front end of the frame 1 is a tail board 5, and spaced longitudinally therefrom and arranged in advance thereof, is a second tail board 6 which is curved rearwardly and forms a stop for the chaff fingers 10 presently to be described. The front tail board 6 merges at its rear end into a downwardly and rearwardly curved grain guide 7, terminating at its lower or inner end in a trough 8 which carries the tailing auger 9, above which latter there is a passage 8ª for grain.

Adjustably mounted on the front face of the tail board 5 is a blast controlling plate-like damper 11, which extends entirely across the frame 1 and is mounted for vertical adjustment on a bolt 12 which extends through a transversely arranged slot 13 in said board 5.

The chaff fingers 10 are carried by a cross bar 16, which is hingedly mounted on the front end of the shaker screen 2, and said fingers operate to direct the chaff into the wind stacker (not shown).

In the use of this attachment the grain that is blown over the first tail board 5 will drop into the chamber formed between said tail board and the tail board 6 and is directed by the curved portion 7 thereof onto the tailing auger 9 which conveys it to the tailing elevator 14 and said elevator carries it back through the machine.

From the above description, it will be obvious that an attachment of this character for thrashing machines effects a great saving in grain, since large quantities mingle with the straw and chaff and are discharged from the straw racks and winnowing devices into the hopper of the wind stacker from which it is withdrawn by the stacker fan and discharged onto the straw stack to become wasted. This attachment separates and collects this grain and returns it to any desired part of the thrasher or to any other desired point.

The preferred embodiment of the invention is disclosed in the drawings and set forth in the specification, but it will be understood that any modifications within the scope of the claimed invention may be made in the construction without departing from the principle of the invention or sacrificing any of its advantages.

What we claim is:

1. The combination with a thrashing machine having a separating screen with a tail board in advance thereof and a tail auger arranged beneath said board; another tail board arranged in advance of and spaced from said first mentioned board to form a grain receiving chamber between them, and a curved guide plate carried by said second mentioned board to direct the grain falling into said chamber onto said tail auger.

2. The combination with a thrashing machine having a grain separator, a chamber arranged in advance of said separator, curved fingers for directing grain received thereon to a suitable place of deposit, and a curved guide supporting the fingers.

3. The combination with a thrashing machine having a separator, longitudinally spaced tail boards arranged in advance of said separator, a tail auger in a plane below said boards and a curved guide plate carried by one of said boards for directing the grain received by said chamber onto said tail auger.

In testimony whereof we affix our signatures hereto.

JOE HUBER.
SAMUEL HUBER.